(12) United States Patent
Noh et al.

(10) Patent No.: US 12,541,303 B2
(45) Date of Patent: Feb. 3, 2026

(54) METHOD OF CLASSIFYING DATA BY LIFESPAN ACCORDING TO THE NUMBER OF TIMES OF MOVING DATA TO IMPROVE PERFORMANCE AND LIFESPAN OF FLASH MEMORY-BASED SSD

(71) Applicant: ULSAN NATIONAL INSTITUTE OF SCIENCE AND TECHNOLOGY, Ulsan (KR)

(72) Inventors: Sam Hyuk Noh, Ulsan (KR); Eun Jae Lee, Ulsan (KR); Hyun Seung Park, Ulsan (KR); Jae Ho Kim, Jinju-si (KR)

(73) Assignee: ULSAN NATIONAL INSTITUTE OF SCIENCE AND TECHNOLOGY, Ulsan (KR)

( * ) Notice: Subject to any disclaimer, the term of this patent is extended or adjusted under 35 U.S.C. 154(b) by 181 days.

(21) Appl. No.: 17/927,446

(22) PCT Filed: Nov. 16, 2021

(86) PCT No.: PCT/KR2021/016802
§ 371 (c)(1),
(2) Date: Nov. 23, 2022

(87) PCT Pub. No.: WO2023/017914
PCT Pub. Date: Feb. 16, 2023

(65) Prior Publication Data
US 2024/0231634 A1 Jul. 11, 2024

(30) Foreign Application Priority Data
Aug. 13, 2021 (KR) .......... 10-2021-0107014

(51) Int. Cl.
*G06F 3/06* (2006.01)

(52) U.S. Cl.
CPC .......... *G06F 3/0616* (2013.01); *G06F 3/0653* (2013.01); *G06F 3/0679* (2013.01)

(58) Field of Classification Search
USPC .............. 707/813, 999.206; 711/12.009
See application file for complete search history.

(56) References Cited

U.S. PATENT DOCUMENTS

2016/0357437 A1* 12/2016 Doerner ............. G06F 3/0613
2017/0168929 A1* 6/2017 Kanno ............. G06F 12/0246
(Continued)

FOREIGN PATENT DOCUMENTS

CN 108920107 A * 11/2018 ............. G06F 3/061
KR 10-2012-0131579 A 12/2012
(Continued)

OTHER PUBLICATIONS

International Search Report for PCT/KR2021/016802 mailed May 3, 2022 from Korean Intellectual Property Office.

*Primary Examiner* — Jared I Rutz
*Assistant Examiner* — Elias Young Kim
(74) *Attorney, Agent, or Firm* — Paratus Law Group, PLLC

(57) ABSTRACT

There is provided a method of classifying data by lifespan according to the number of times of moving data to improve performance and lifespan of a flash memory-based SSD. The method includes: a number of movements tracking step of tracking the number of times of moving a plurality of pages having data written therein from an arbitrary block to another block by Garbage Collection (GC) in the flash memory-based solid-state drive (SSD) starting from a time point of initial writing until a time point of invalidation of erasing or overwriting, by software mounted on a computer system; and a separation group forming step of forming separation groups by grouping one or more pages having the (Continued)

same number of times of moving data among the plurality of pages into one or more blocks by the software.

3 Claims, 4 Drawing Sheets

(56) References Cited

U.S. PATENT DOCUMENTS

| | | | |
|---|---|---|---|
| 2017/0177652 A1* | 6/2017 | Danilov | G06F 3/0652 |
| 2018/0067850 A1* | 3/2018 | Kawamura | G06F 12/00 |
| 2018/0157427 A1* | 6/2018 | Hong | G06F 3/0679 |
| 2018/0276113 A1* | 9/2018 | Navon | G06F 3/0631 |
| 2020/0310956 A1* | 10/2020 | Kim | G06F 12/0253 |
| 2021/0133166 A1* | 5/2021 | Shabi | G06F 3/0683 |
| 2021/0240632 A1 | 8/2021 | Jeon | |
| 2022/0164123 A1* | 5/2022 | Kim | G06F 3/0659 |
| 2022/0269606 A1* | 8/2022 | Su | G06F 12/084 |

FOREIGN PATENT DOCUMENTS

| | | |
|---|---|---|
| KR | 101356470 B1 * | 1/2014 |
| KR | 10-1880190 B1 | 7/2018 |
| KR | 10-2019-0094098 A | 8/2019 |
| KR | 10-2020-0057473 A | 5/2020 |

* cited by examiner

METHOD OF CLASSIFYING DATA BY LIFESPAN ACCORDING TO THE NUMBER OF TIMES OF MOVING DATA TO IMPROVE PERFORMANCE AND LIFESPAN OF FLASH MEMORY-BASED SSD

CROSS-REFERENCE TO PRIOR APPLICATIONS

This application is a National Stage Patent Application of PCT International Patent Application No. PCT/KR2021/016802 (filed on Nov. 16, 2021) under 35 U.S.C. § 371, which claims priority to Korean Patent Application No. 10-2021-0107014 (filed on Aug. 13, 2021), which are all hereby incorporated by reference in their entirety.

BACKGROUND

The present invention relates to a method of classifying data by lifespan according to the number of times of moving data to improve performance and lifespan of a flash memory-based SSD, and more specifically, to a method of classifying data by lifespan according to the number of times of moving data to improve performance and lifespan of a flash memory-based SSD, in which data is classified by lifespan according to the number of times of moving a plurality of pages having data written therein from an arbitrary block to another block by Garbage Collection (GC) starting from a time point of initial writing until a time point of invalidation.

A solid-state drive (SSD) is a storage device configured by combining a plurality of NAND flash memories in parallel. Since the SSD operates on the basis of semiconductor unlike mechanically operating hard disk drives (HDD), performance is improved from the aspect of data transfer speed and random input/output, and utilization as a storage device for servers, desktops, and laptops is increasing recently as power consumption is lowered.

As a critical characteristic of the NAND flash memory constituting the SSD, the number of times of writing/erasing is limited for each cell, and overwriting at the same place is not allowed. A single-level cell (SLC) has a limited number of times of about 100,000, a multi-level cell (MLC) has a limited number of times of about 10,000, and a triple-level cell (TLC) has a limited number of times of about 1,000. When the limited number of times is exceeded, a corresponding cell does not operate normally. In addition, since the NAND flash memory may not overwrite at the same place unlike the HDD, the write operation is allowed only in an empty page.

Valid data and invalid data are generated in the SSD by write and erase operations of the SSD. The valid data is generated through a write operation when input data is stored in the SSD, and the invalid data is generated by update and erasure of valid data. The invalid data is maintained until it is completely erased as garbage collection (GC) occurs, and the space occupied by the invalid data is turned into an empty space after the garbage collection is completed.

Here, the garbage collection (GC) is a process of making an empty block by erasing invalid data of a block in the NAND flash memory. Although the garbage collection (GC) operation compensates for the inability of overwriting at the same place, it lowers I/O speed of the SSD due to copying valid pages from victim blocks and slow erase operation.

Although studies on hot/cold or semantic classification methods disclosed in Non-Patent Documents 1 to 6 are conducted recently to solve the garbage collection (GC) problem and improve performance of the SSD, the classification method has a limitation in that additional data structures or interface modifications for data classification are required. Accordingly, it needs to develop a technique capable of solving the problem of garbage collection (GC) by classifying data without additional memory consumption or a designated interface.

SUMMARY

Therefore, the present invention has been made in view of the above problems, and it is an object of the present invention to provide a method of classifying data by lifespan according to the number of times of moving data to improve performance and lifespan of a flash memory-based SSD, in which data is classified by lifespan according to the number of times of moving a plurality of pages having data written therein from an arbitrary block to another block by Garbage Collection (GC) starting from a time point of initial writing until a time point of invalidation, so that the speed of copying valid pages from a victim block and erase operation of the garbage collection (GC) may be improved, and performance of the SSD may also be improved as the input/output (I/O) speed of the SSD is increased.

Another object of the present invention is to provide a method of classifying data by lifespan according to the number of times of moving data to improve performance and lifespan of a flash memory-based SSD, in which the number of times of moving data is stored in an OOB unit, which is an additional space provided at one side of a plurality of pages, as soon as the plurality of pages is moved from an arbitrary block to another block by Garbage Collection (GC), so that the method may be implemented at the software level of the SSD without additional memory consumption or a specified interface. To accomplish the above object, according to one aspect of the present invention, there is provided a method of classifying data by lifespan according to the number of times of moving data to improve performance and lifespan of a flash memory-based SSD, the method comprising: a number of movements tracking step of tracking the number of times of moving a plurality of pages having data written therein from an arbitrary block to another block by Garbage Collection (GC) in the flash memory-based solid-state drive (SSD) starting from a time point of initial writing until a time point of invalidation of erasing or overwriting, by software mounted on a computer system; and a separation group forming step of forming separation groups by grouping one or more pages having the same number of times of moving data among the plurality of pages into one or more blocks by the software.

According to the present invention described above, as data is classified by lifespan according to the number of times of moving a plurality of pages having data written therein from an arbitrary block to another block by Garbage Collection (GC) starting from a time point of initial writing until a time point of invalidation, a block including a page in which data except cold data is written may be erased without a separate copy process. Accordingly, there is an effect of improving the speed of copying valid pages from a victim block and erase operation of the garbage collection (GC), and improving performance of the SSD as the input/output (I/O) speed of the SSD is increased.

In addition, as the present invention is provided to store the number of times of moving data in an OOB unit, which is an additional space provided at one side of a plurality of pages, as soon as the plurality of pages is moved from an arbitrary block to another block by garbage collection (GC), there is an effect of implementing the method at the software level of the SSD without additional memory consumption or a designated interface.

DETAILED DESCRIPTION

Although general terms widely used presently are selected as the terms used in this specification as much as possible in consideration of the functions of the present invention, this may vary according to the intention of those skilled in the art, precedents, advent of new technologies, or the like. In addition, in a specific case, there may be terms arbitrarily selected by an applicant, and in this case, the meaning will be described in detail in the description of the corresponding invention. Therefore, the terms used in the present invention should be defined based on the meaning of the terms and the overall contents of the present invention, rather than simple names of the terms. Unless otherwise defined, all terms used herein, including technical or scientific terms, have the same meaning as commonly understood by those skilled in the art. Terms such as those defined in a commonly used dictionary should be interpreted as having a meaning consistent with the meaning in the context of the related art, and are not construed in an ideal or excessively formal sense unless explicitly defined in this application.

Figure 1:
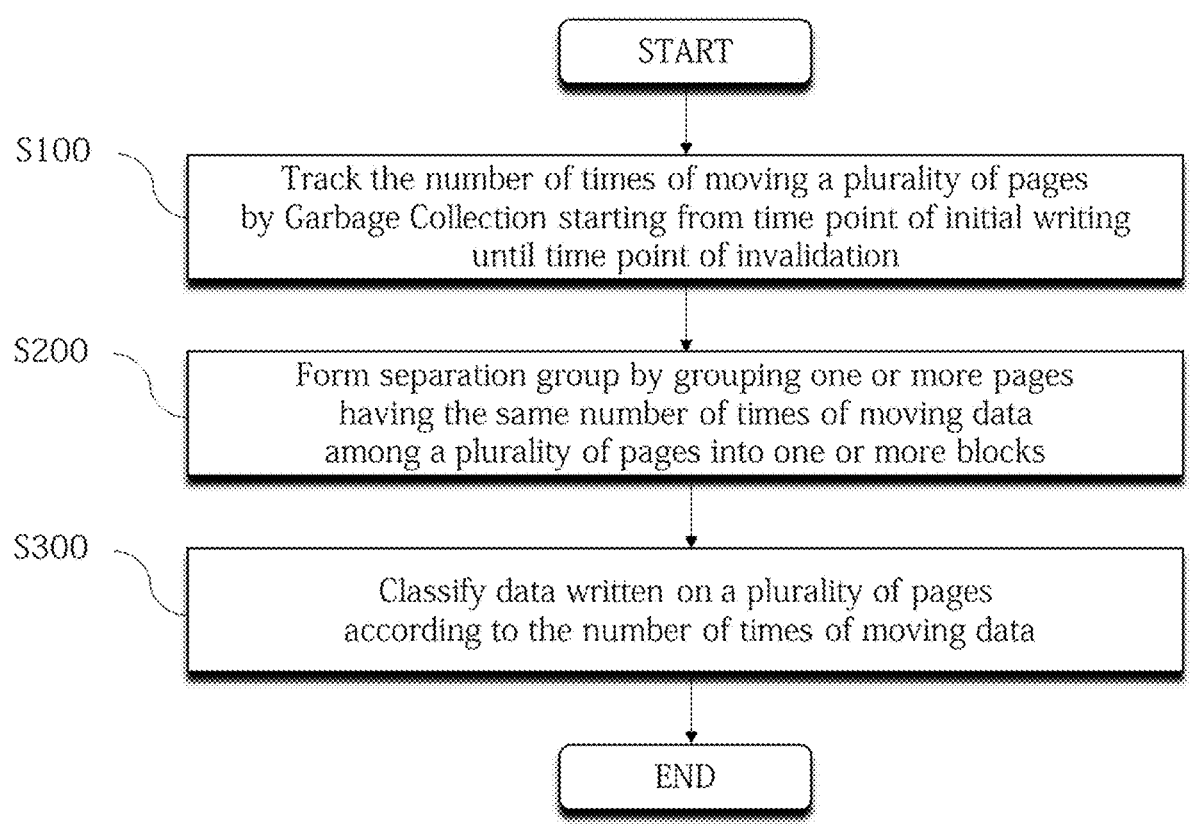
FIG. 1 is a flowchart illustrating a method of classifying data by lifespan according to the number of times of moving data to improve performance and lifespan of a flash memory-based SSD of the present invention.
Figure 2:
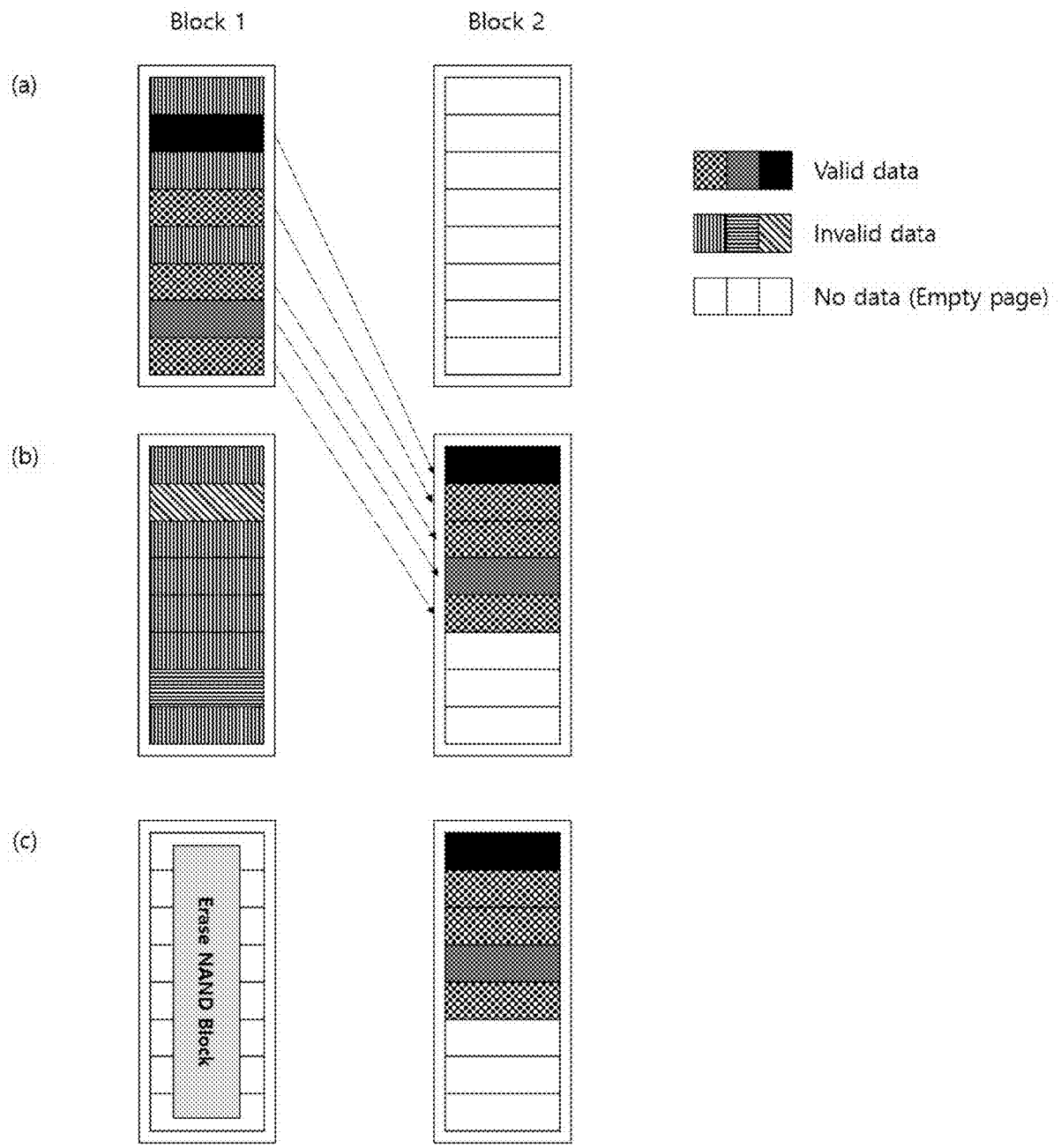
FIG. 2 is a view showing conventional garbage collection (GC).
Figure 3:
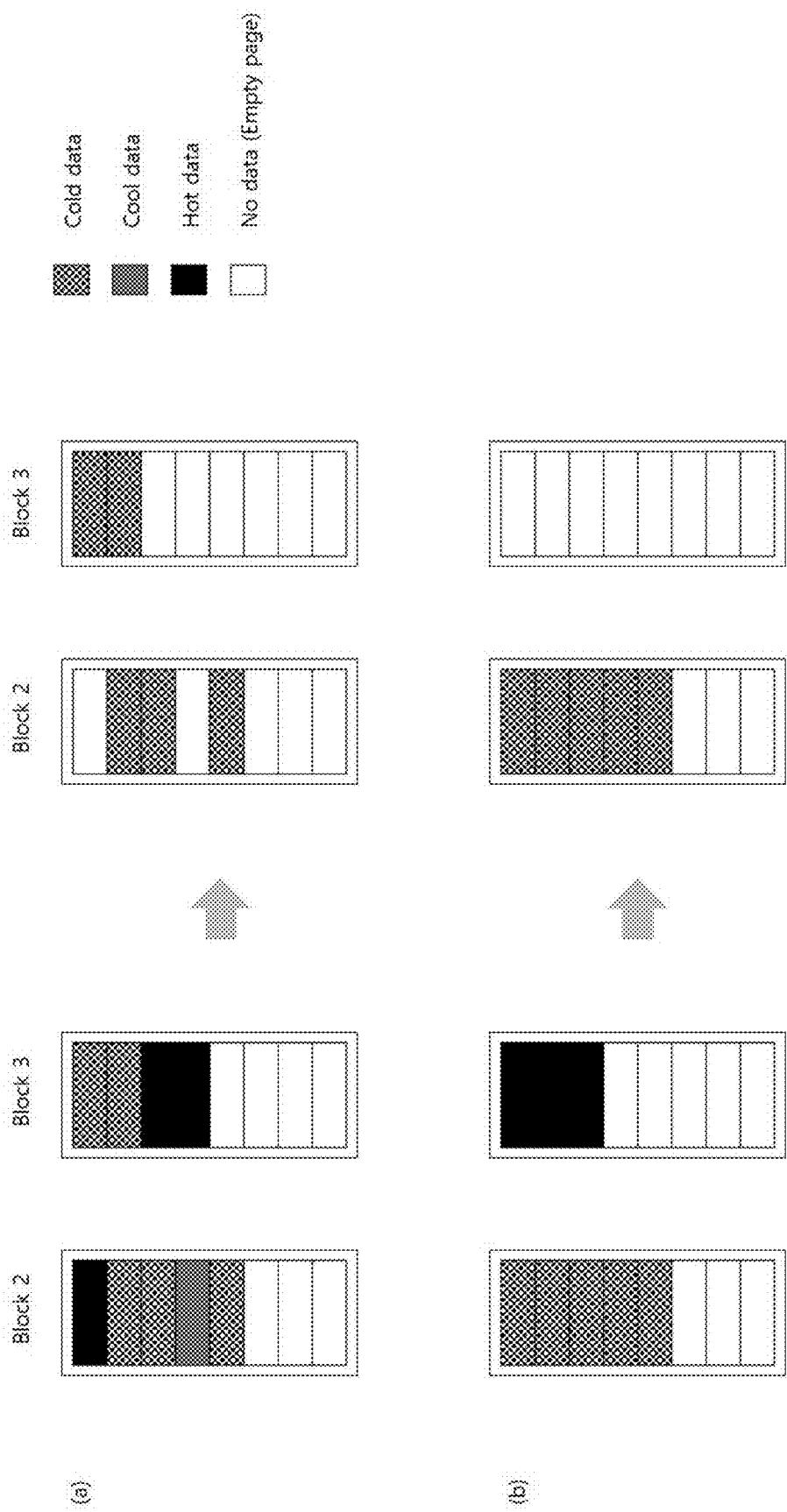
FIG. 3 is a view showing a case in which data is not classified according to the prior art (a) and a case in which data is classified by lifespan according to the number of times of moving data according to an embodiment of the present invention (b).
Figure 4:
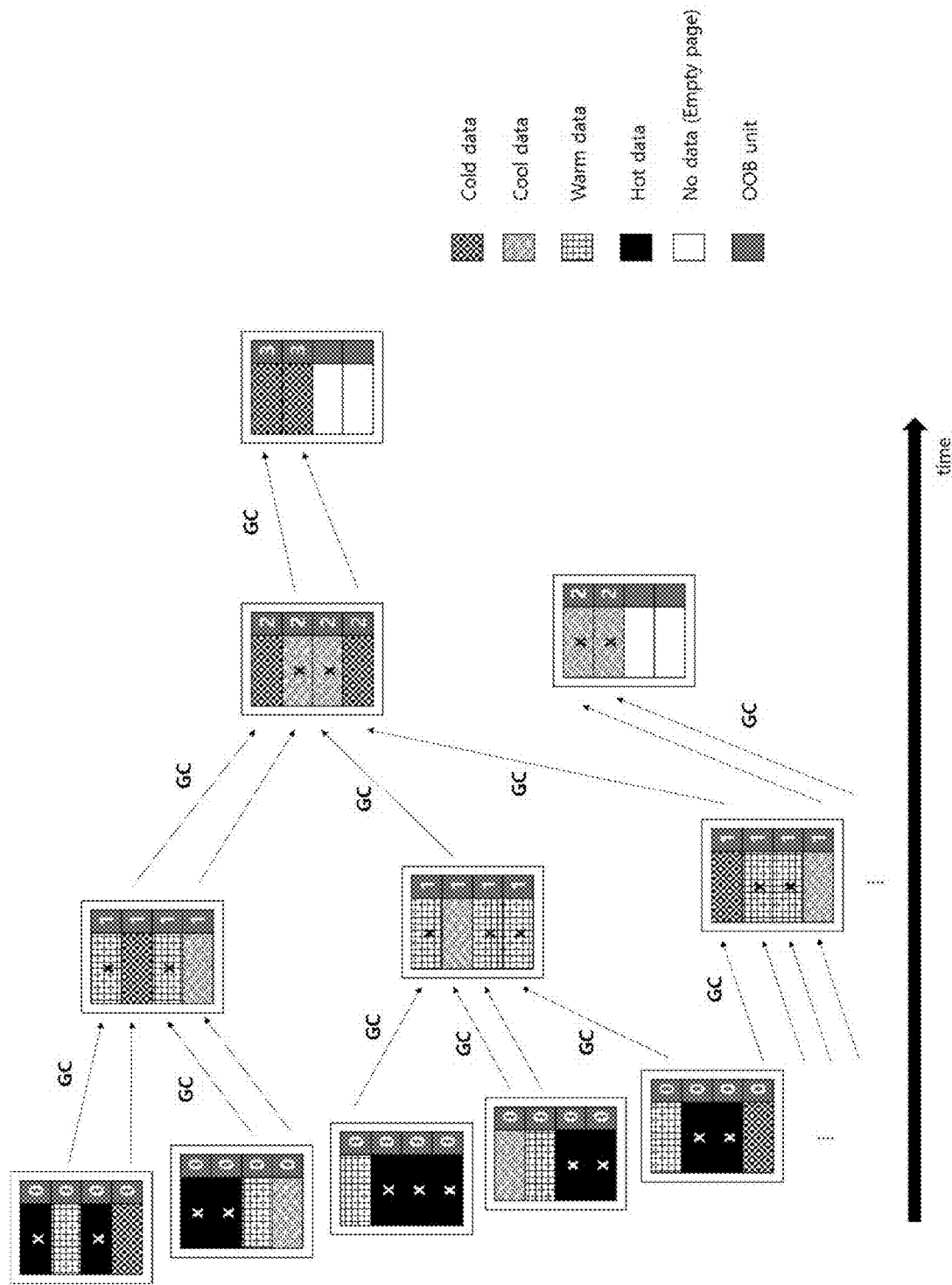
FIG. 4 is a view showing a separation group forming step according to an embodiment of the present invention.

Hereinafter, an embodiment according to the present invention will be described in detail with reference to the accompanying drawings. FIG. 1 is a flowchart illustrating a method of classifying data by lifespan according to the number of times of moving data to improve performance and lifespan of a flash memory-based SSD 100 of the present invention. FIG. 2 is a view showing conventional garbage collection (GC). FIG. 3 is a view showing a case in which data is not classified according to the prior art (a) and a case in which data is classified by lifespan according to the number of times of moving data according to an embodiment of the present invention (b). FIG. 4 is a view showing a separation group forming step (S200) according to an embodiment of the present invention.

Generally, a flash memory may be configured of a block including a plurality of pages, a plane including a plurality of blocks, and a die including a plurality of planes. In addition, read and write commands may be performed in units of pages in the flash memory, whereas data erasure may be performed only in units of blocks, which are upper units of the pages.

In addition, generally, garbage collection (GC) is a process of moving pages containing valid data in a block to another block before erasing the block. More specifically, referring to FIG. (a), invalid data that has been invalidated by garbage collection (GC) and valid data that has not been yet invalidated are written together in block 1. Block 2 contains empty pages with no data.

Here, referring to FIG. 2(b), only the valid data is copied to block 2, and the copied valid data is invalidated in block 1. In addition, referring to FIG. 2(c), since block 1 includes only invalid data, erasure is processed in units of blocks so that block may be reused.

However, in the conventional garbage collection (GC), hot data that is the easiest to invalidate, i.e., more frequently updated, cool data that is easier to invalidate than cold data, and cold data that is least easy to invalidate are written together, without being classified, in block 2 configured of only valid data.

More specifically, in block 2 and block 3 shown in FIG. 3(a), hot data, cool data, and cold data indicated by temperature according to the degree of ease of invalidation are written together without being classified, and after all the hot data and the cool data are invalidated, cold data are distributed and written in block 2 and block 3, respectively.

That is, in order to reuse the blocks, a process of copying and merging distributed cold data into either block 2 or block 3 should be added. Accordingly, in the conventional garbage collection (GC), there is a limit in improving performance of the SSD since copying valid pages from a victim block and the erase operation is slowed down and input/output (I/O) speed of the SSD is lowered as unnecessary data copy is continued.

However, in the present invention, as a result of performing a number of movements tracking step (S100) and a separation group forming step (S200), block 2 configured of only the pages including cold data, which is most difficult to invalidate, is formed as shown in FIG. 3(b), and block 3 may be immediately erased to reuse the block without performing a separate valid data copy process. Accordingly, there is a remarkable effect of improving performance of the SSD 100 as the speed of erase operation of the garbage collection (GC) can be improved and input/output (I/O) speed of the SSD 100 can be improved.

In implementing the present invention, first, referring to FIG. 1, the method of classifying data by lifespan according to the number of times of moving data to improve performance and lifespan of a flash memory-based SSD 100 of the present invention includes a number of movements tracking step (S100) and a separation group forming step (S200).

The present invention may be implemented as software in the operating system according to a configuration that manages firmware or flash memory.

More specifically, at the number of movements tracking step (S100), software 210 mounted on a computer system 200 tracks the number of times of moving a plurality of pages having data written therein from an arbitrary block to another block by Garbage Collection (GC) in the flash memory-based solid-state drive (SSD) starting from a time point of initial writing until a time point of invalidation of erasing or overwriting.

Here, the number of times of moving data may be stored in an Out-of-Band (OOB) unit, which is an additional space provided at one side of a plurality of pages, as soon as the plurality of pages is moved from an arbitrary block to another block by garbage collection (GC).

That is, the number of times of moving data is 0 at the time point of initial writing, and whenever a plurality of pages is moved from an arbitrary block to another block by garbage collection (GC), the number of times of moving data increased by may be stored. For example, referring to FIG. 4, the OOB unit 110, which is an additional space provided at one side of a plurality of pages, is displayed in gray. In addition, it can be confirmed that whenever a plurality of pages is moved from an arbitrary block to another block by garbage collection (GC), the numbers 0, 1, 2, and 3 increased by 1 are stored.

Next, at the separation group forming step (S200), separation groups are formed by the software 210 by grouping one or more pages having the same number of times of moving data among the plurality of pages into one or more blocks.

That is, when one or more pages having the same number of times of moving data among a plurality of pages are grouped as many as the number of pages that can be accommodated in one block, the remaining pages are also grouped as many as the number of pages that can be accommodated in another block. Accordingly, there may be one or more blocks having the same number of times of moving data, and one or more of such blocks may be formed as a separation group.

Referring to FIG. 4 as an example, there are twenty or more pages, in which the number of times of moving data is 0, and each of a plurality of blocks may accommodate only four pages. Accordingly, at the separation group forming step (S200), four pages, in which the number of times of moving data is 0, may be grouped into one block, and five or more such blocks may be formed. In addition, five or more blocks each including four pages, in which the number of times of moving data is 0, may be formed as 'separation group 0'. In addition, at the separation group forming step (S200), four pages, in which the number of times of moving data is 1, may be grouped into one block, and three or more of such blocks may be formed. In addition, three or more blocks each including four pages, in which the number of times of moving data is 1, may be formed as 'separation group 1'.

In addition, at the separation group forming step (S200), six pages, in which the number of times of moving data is 2, may be grouped into a group of four and a group of two pages, and two blocks respectively including four pages and two pages may be formed. In addition, two blocks each including the pages, in which the number of times of moving data is 2, may be formed as 'separation group 2'. Finally, at the separation group forming step (S200), two pages, in which the number of times of moving data is 3, may be grouped into one block, and only one such block may be formed. In addition, one block including the pages, in which the number of times of moving data is 3, may be formed as 'separation group 3'.

Here, at the separation group forming step (S200), when the OOB unit 110 is based on an n-bit unit, $2^n$ separation groups may be formed, and data written on one or more pages, in which the number of times of moving data is $2^n-1$ or more, may be classified as cold data that is most difficult to invalidate. Here, n is a positive integer.

For example, when the OOB unit 110 is based on a 2-bit unit, four separation groups may be formed, and separation group 0, separation group 1, separation group 2, and separation group 3 may be formed as described above. In addition, each separation group may have 0, 1, 2, or 3 as the number of times of moving data in order. At the separation group forming step (S200), data written on one or more pages in a block included in the separation group 3, in which the number of times of moving data is 3 or more, may be classified as cold data that is most difficult to invalidate.

Next, the present invention may further include a data classification step (S300) of classifying, by the software 210, data written on the plurality of pages according to the number of times of moving data.

That is, at the data classification step (S300), data written on one or more pages formed as 'separation group 0' at the separation group forming step (S200) as the number of times of moving data is 0 may be classified as hot data that is easiest to invalidate. In addition, data written on one or more pages formed as 'separation group 1' as the number of times of moving data is may be classified as warm data that is easy to invalidate next to the hot data. In addition, data written on one or more pages formed as 'separation group 2' as the number of times of moving data is 2 may be classified as cool data that is easy to invalidate next to the warm data.

However, since the separation groups mentioned above are created on the basis of 2 bits, data may be classified by comparing four data lifespans to a temperature range according to the number of times of moving data, and furthermore, when the OOB unit 110 writes data on the basis of 3 bits or more, the data may be classified by further subdividing eight or more data lifespans into a temperature range, and thus it is not limited to a specific temperature range.

Here, the data lifespan refers to the amount of data written in the flash memory-based solid-state drive (SSD) 100 starting from a time point of initial writing until a time point of invalidation of erasing or overwriting. That is, the shorter the data lifespan, the more the data is close to the hot data and comparatively easy to invalidate, and the longer the data lifespan, the more the data is close to the cold data and comparatively not easy to invalidate.

Therefore, as shown in FIG. 3(b), in the present invention, a plurality of data may be classified into blocks including only cold data that is not easy to invalidate, and other blocks. In addition, as the blocks including data except cold data are erased without a separate copy process, and only the cold data is written as valid data, the present invention has a remarkable effect of erasing blocks having empty pages without going through a separate copy process.

In addition, as the present invention is provided to store the number of times of moving data in the OOB unit, which is an additional space provided at one side of a plurality of pages, as soon as the plurality of pages is moved from an arbitrary block to another block by garbage collection (GC), there is a remarkable effect of implementing the method at the software level of the SSD without additional memory consumption or a designated interface, and solving the problem of slowing down the erase operation of the garbage collection (GC) by classifying data as described above.

Although the embodiments have been described as described above with reference to the limited embodiments and drawings, those skilled in the art may make various changes and modifications from the above descriptions. For example, although the described techniques are performed in an order different from that of the described method, and/or although the components of the systems, structures, devices, circuits, and the like described above are coupled or combined in a manner different from those of the methods described above, or replaced or substituted by other components or equivalents, appropriate results may be achieved.

Therefore, other implementations, other embodiments, and equivalents to the claims are also within the scope of the claims described below.

The invention claimed is:

1. A method of classifying data by lifespan according to a number of times of moving data, the method comprising:
   tracking a number of times of moving a plurality of pages having data written therein from an arbitrary block to another block by Garbage Collection in a flash memory-based solid-state drive (SSD) starting from a time point of initial writing of the data of the plurality of pages until a time point of invalidation of the data of the plurality of pages by erasing or overwriting, by software mounted on a computer system; and forming separation groups by grouping one or more pages having a same number of times of moving data among the plurality of pages into one or more blocks by the software, wherein the number of times of moving data is stored in an out-of-band (OOB) unit, which is an additional space provided at one side of each page of the plurality of pages, subsequent to the plurality of pages being moved from the arbitrary block to another block by Garbage Collection (GC), wherein the forming of separation groups includes forming $2^n$ separation groups based on the OOB unit being based on an n-bit unit, wherein n comprises a positive integer, wherein the forming of the separation groups further includes classifying, by the software, data written on the plurality of pages according to the number of times of moving data, wherein the classifying further includes classifying the number of times of moving data is 0 at the time point of initial writing, and increasing the number of times of moving data by 1 based on the plurality of pages being moved from the arbitrary block to another block by garbage collection, and wherein, in the classifying of the data written on the plurality of pages, data written on one or more pages formed in a group, in which the number of times of moving data is 0, is classified as data that is most frequently updated, and data written on one or more pages formed in a group, in which the number of times of moving data is largest, is classified as data that is least frequently updated.

2. The method according to claim 1, wherein the forming of the separation groups further includes classifying data written on one or more pages, in which the number of times of moving data is $2^n-1$ or more, as data that is least frequently updated, and wherein n comprises a positive integer.

3. The method according to claim 1, wherein each page of the plurality of pages is provided a space having data written therein and the OOB unit is an additional space provided at one side of the space having the data.

* * * * *